United States Patent
Kammler et al.

(10) Patent No.: US 7,011,129 B2
(45) Date of Patent: Mar. 14, 2006

(54) DEVICE FOR WELDING OF A FOIL TUBE

(75) Inventors: Roman Kammler, Worms (DE); Walter Baur, Gruendau (DE)

(73) Assignee: Rovema Verpackungsmaschienen GmbH, Fernwald (DE)

( * ) Notice: Subject to any disclaimer, the term of this patent is extended or adjusted under 35 U.S.C. 154(b) by 96 days.

(21) Appl. No.: 10/885,498

(22) Filed: Jul. 6, 2004

(65) Prior Publication Data
US 2005/0067109 A1 Mar. 31, 2005

(30) Foreign Application Priority Data
Jul. 11, 2003 (DE) ................. 103 31 361

(51) Int. Cl.
*B30B 15/00* (2006.01)

(52) U.S. Cl. .................... 156/580; 156/583.1

(58) Field of Classification Search ............... 156/580, 156/581, 583.1, 228; 53/451, 551; 100/315, 100/316, 324, 325; 493/189, 209
See application file for complete search history.

(56) References Cited

U.S. PATENT DOCUMENTS

| | | | | |
|---|---|---|---|---|
| 4,729,210 A | * | 3/1988 | Galliano | 53/441 |
| 4,768,327 A | * | 9/1988 | Mosher | 53/451 |
| 5,170,609 A | * | 12/1992 | Bullock et al. | 53/434 |
| 5,271,210 A | * | 12/1993 | Tolson | 53/550 |
| 5,540,035 A | * | 7/1996 | Plahm et al. | 53/451 |
| 5,791,126 A | | 8/1998 | Kammler et al. | |
| 6,658,821 B1 | * | 12/2003 | Townsend | 53/459 |

* cited by examiner

*Primary Examiner*—James Sells
(74) *Attorney, Agent, or Firm*—Flynn, Thiel, Boutell & Tanis, P.C.

(57) ABSTRACT

In order to achieve, in a device for welding of a foil tube comprising two welding jaws, which can be moved against one another and clamp the foil tube between one another, a relatively low building height of the device and a high welding force, it is suggested that a gearing has four rods, of which two inner rods are pivotally fastened through a stationary joint, and two outer rods are each connected through one joint to an inner rod and a further joint to a jaw carrier, and that a movable part of a linear drive is connected to the inner rods through a connecting member in order to pivot the inner rods and thus the jaw carriers away from one another or toward one another during a movement of the movable part along its active line.

8 Claims, 2 Drawing Sheets

DEVICE FOR WELDING OF A FOIL TUBE

FIELD OF THE INVENTION

The subject matter of the patent application is a device for welding of a foil tube for packaging purposes.

BACKGROUND OF THE INVENTION

Vertical tubular bagging machines are known, with which top-side and bottom-side welded, filled tubular bags are manufactured. A foil tube is for this purpose initially longitudinally welded. Then the foil tube is filled, is welded transversely to its transport direction, and a finished tubular bag is separated from the foil tube.

Many different drives and gearings are known to operate the welding jaws, which carry out the cross-welding of the foil tube in order to produce the top and bottom seams of the tubular bags.

A device for welding of a foil tube is known from the DE 196 27 892 A1, which device, is suited for this cross-welding.

The foil tube is in this known device welded by means of two welding jaws, which are movable against one another and clamp the foil tube between one another, each one jaw holder serves thereby to hold one welding jaw and each one jaw carrier to carry one jaw holder and thus a welding jaw. A linear drive with a part movable linearly along an active line is provided as the drive. A gearing is connected to the movable part, whereby the gearing is also connected to the jaw carriers in order to produce an opposing movement of the jaw carriers and thus of the welding jaws in order to be able to move the welding jaws toward one another and away from one another. One joint each is thereby provided on the jaw carriers in order to pivotally connect rods of the gearing to the jaw carriers.

The known device has the disadvantage that it has a rod, which serves as a lever to enlarge the welding pressure. This rod reaches downwardly to the linear drive and results together with same in a relatively high construction for this device, which in practice can result in a space problem on a vertical tubular bagging machine.

SUMMARY OF THE INVENTION

The basic purpose of the invention is to further develop a device for welding of a foil tube in such a manner that a relatively low construction can be achieved.

The purpose is attained according to the appended claims. The gearing has, accordingly, four rods, of which two inner rods are pivotally fastened through a stationary joint, and two outer rods are each connected through one joint to an inner rod and by a further joint to a jaw carrier. The movable part is connected to the inner rods through a connecting member in order to pivot the inner rods and thus the jaw carriers away from one another or toward one another during a movement of the movable part along an active line.

The inventive device has the advantage that it can be designed to be relatively low. The movable part can act in the plane of the relatively flat gearing or at a small distance offset parallel thereto. Thus, embodiments are possible which are only approximately 200 mm high. Also, higher constructions are conceivable, which could be utilized when a relatively high space is available.

Further advantageous embodiments of the inventive device are described in the appended claims.

A financially advantageous simplification of the gearing is achieved when the stationary joint is positioned on an extension of the active line, and the gearing is designed axis-symmetrically with respect to the active line. When the gearing has a symmetrical design with the active line as the axis of symmetry, then only rods of one type are needed. Moreover, the welding jaws hit the foil-tube diameter centrally when they begin an equal distance from this centerline, which results in small tangential pulling forces on the foil tube and thus in a good welding result.

When the connecting member houses two further rods, which on the one side are connected to the movable part through a moving joint on the movable part, and on the other side to an inner rod each through one further moving joint, then a gearing is achieved, which through a suitable selection of the rod lengths enables a desired welding-jaw movement during a linear movement of the movable part. A lever function is realized in this gearing. The welding force is increased when the further moving joints are farther from the stationary joint than the joints on the inner rods.

A further, very reliable design of the gearing is achieved when the connecting member has a mounting which is preferably connected to the movable part by means of a mounting plate, two guideways pivotal about each one joint are provided on the mounting, which guideways are preferably designed as slideways, and each guideway grips an inner rod and can be moved along said rod. This gearing has in addition the advantage that it also has a relatively low construction width transversely to the direction of movement. It is also very compact.

Any desired path lines are achieved when a control device is provided in order to time-dependently control the movement of the movable part. The term path line is hereby understood to be the movement of a welding jaw in a location-time diagram. Thus it is possible to, for example, extend the welding operation and reduce the width of the jaw opening in order to achieve a safe and relatively quick bag manufacture. Thus, a rod exchange is no longer necessary, or is only seldom necessary.

When the linear drive is designed as a linear motor, which operates according to the principle of a suspension railway, then very quick and location-precise controllable jaw movements can be achieved. This electromagnetic linear drive has, in addition, the advantage that a relatively high sealing pressure of approximately 5 to 8 kN is achieved. A precise pressure adjustment is thereby possible by limiting the power output of the linear motor.

When the jaw carriers are each connected to the jaw holders through two rigid connections guided in guideways, then a very stable, torsion-free design of the relative flat device is achieved.

BRIEF DESCRIPTION OF THE DRAWINGS

The invention will be described in greater detail hereinafter in connection with figures illustrating two exemplary embodiments. In the drawings.

DETAILED DESCRIPTION

Figure 1:
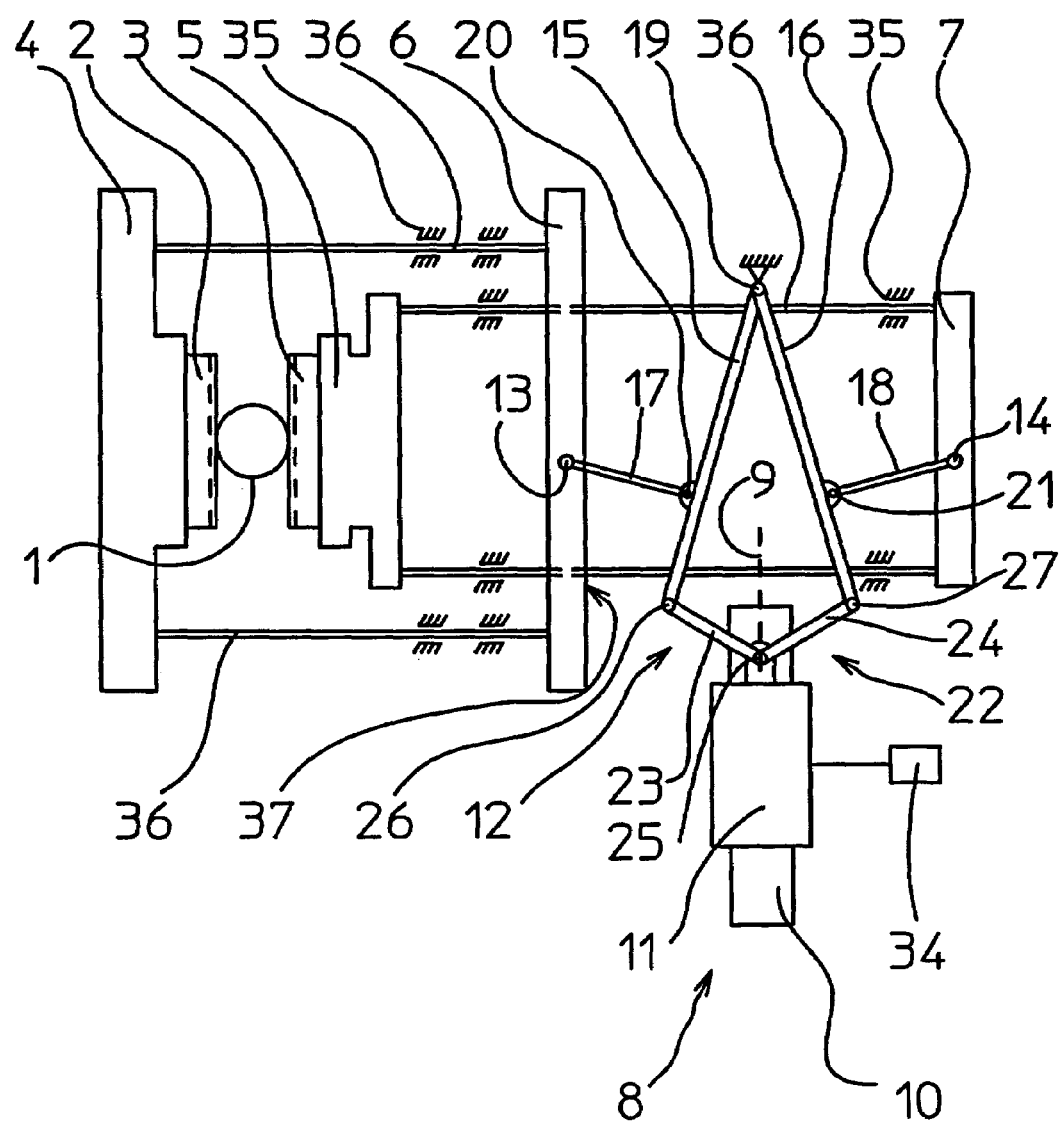
FIG. 1 is a view from above of a device for welding of a foil tube, in which a linear motor with a gearing having six rods is utilized for the purpose of moving welding jaws against the foil tube in order to weld same transversely to its transport direction.

In a device for welding of a foil tube 1, this welding occurs by means of two welding jaws 2, 3, which can be moved against one another and clamp the foil tube 1 between one another (FIG. 1). Two jaw holders 4, 5 are used to hold each one welding jaw 2, 3 and jaw carriers 6, 7 are each used to carry one jaw holder 4, 5 and thus the welding jaws 2, 3. The jaw carriers 6, 7 are each connected to the jaw holders 4, 5 by two rigid connections 36 guided in guideways 35. Two connections 36 are further inserted in a sliding manner through two openings 37 of the jaw carrier 6. A linear drive 8 with a part 11, which is linearly movable along an active line 9 and a stationary part 10, serves as the drive for the jaw movement. The movable part 11 is connected to the gearing 12. Also the gearing 12 is connected to the jaw carriers 6, 7 in order to create an opposing movement of the jaw carriers 6, 7 and thus of the welding jaws 2, 3 in order to be able to move the welding jaws 2, 3 toward one another and away from one another. Each one joint 13, 14 exists on the jaw carriers 6, 7 in order to pivotally connect rods 17, 18 of the gearing 12 to the jaw carriers 6, 7.

The gearing 12 has four rods 15, 16, 17, 18, of which two inner rods 15, 16 are pivotally fastened through a stationary joint 19, and two outer rods 17, 18 are connected through each one joint 20, 21 on an inner rod 15, 16 and a further joint 13, 14 to a jaw carrier 6, 7. The movable part 11 is connected to the inner rods 15, 16 through a connecting member 22 in order to be able to pivot the inner rods 15, 16, and thus the jaw carriers 6, 7, away from one another or toward one another during a movement of the movable part 11 along an active line 9. The connecting member 22 houses two further rods 23, 24, which on the one side are connected to the movable part 11 through a moving joint 25, and on the other side to an inner rod 15, 16 through each one further moving joint 26, 27. The stationary joint 19 is positioned on an extension of the active line 9. The gearing 12 is designed axis-symmetrically with respect to the active line 9. In order to form a lever to achieve an increased welding pressure, the moving joints 26, 27 are removed farther from the stationary joint 19 than the joints 20, 21.

A control device 34 is provided in order to time-dependently control the movement of the movable part, and in order to achieve in this manner a relatively long welding duration and a quick opening and closing of the jaws.

In order to realize a very quick jaw movement. The linear drive 8 is designed as a linear motor, which operates in accordance with the principle of a suspension railway.

The device illustrated in FIG. 1 extends mainly in the horizontal direction and has a very low construction height in the vertical direction, thus providing this advantage to a corresponding vertical tubular bagging machine that houses this device.

Figure 2:
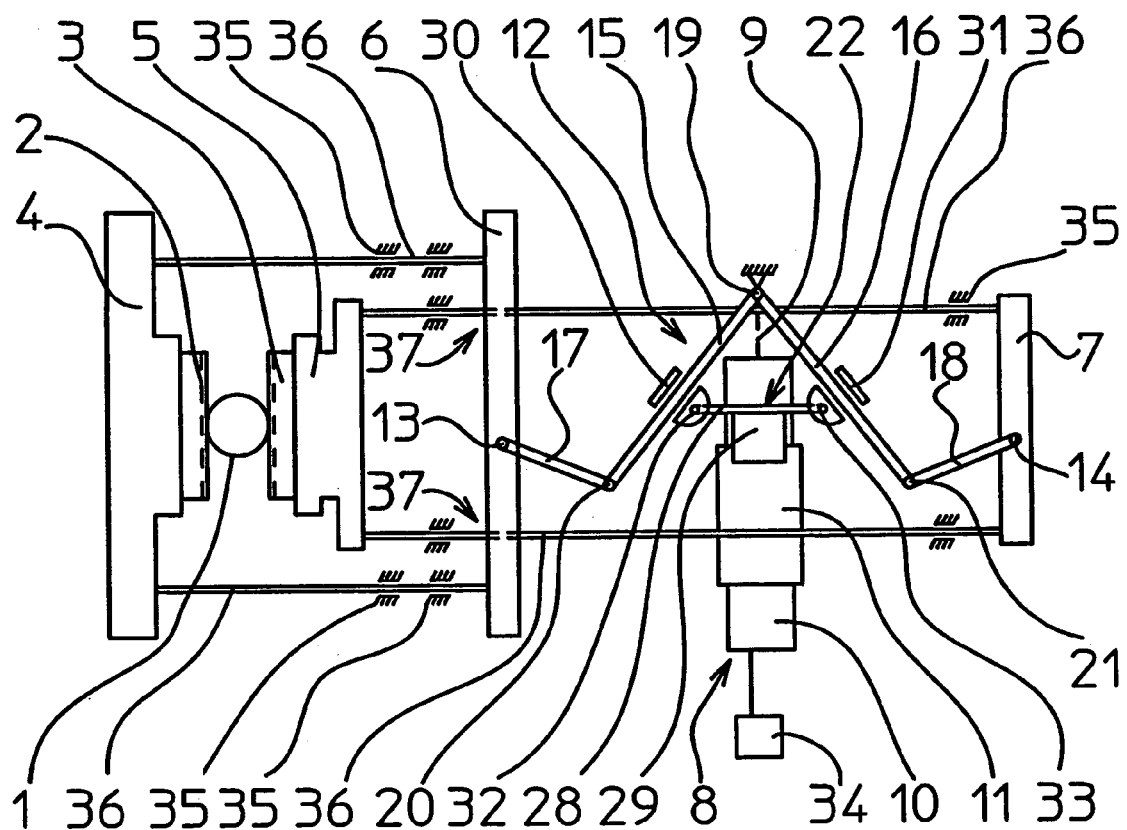
FIG. 2 is a view from above of a different design of a device for welding of a foil tube, whereby the gearing has only four rods.

The same advantages apply for the embodiment illustrated in FIG. 2. However, differing from the device of FIG. 1, the connecting member 22 has here a mounting 28, which is connected to the movable part 11 by means of an installation plate 29. Two guideways 30, 31, which are pivotal about each one joint 32, 33 and which are designed as slideways, are provided on the mounting 28. Each guideway 30, 31 grips an inner rod 15, 16 and is movable along the rod 15, 16. This embodiment is suited for large welding forces.

The invention claimed is:

1. A device for welding of a foil tube, comprising two welding jaws, which can be moved against one another and clamp the foil tube between one another, two jaw holders for holding each one welding jaw, each one jaw carrier for carrying of the jaw holders and thus the welding jaws, a linear drive with a movable part which can be moved linearly along an active line and a stationary part, a gearing connected to the movable part, whereby the gearing is connected to the jaw carriers in order to create an opposing movement of the jaw carriers and thus of the welding jaws, and in order to be able to move the welding jaws toward one another and away from one another, and comprising each one joint on the jaw carriers in order to pivotally connect rods of the gearing to the jaw carriers, wherein the gearing has four rods, of which two inner rods are pivotally fastened through a stationary joint, and two outer rods are connected to an inner rod through each joint and a further joint to a jaw carrier, and that the movable part is connected to the inner rods through a connecting member in order to pivot during a movement of the movable part along an active line the inner rods and thus the jaw carriers away from one another or toward one another.

2. The device according to claim 1, wherein the stationary joint is positioned on an extension of the active line, and that the gearing is designed axis-symmetrically with respect to the active line.

3. The device according to claim 1, wherein the connecting member includes two further rods, which are connected on one side through a moving joint on the movable part to the movable part, and on the other side through each one further moving joint to an inner rod.

4. The device according to claim 3, wherein the moving joints are farther from the stationary joint than the joints.

5. The device according to claim 1, wherein the connecting member has a mounting, which is preferably connected to the movable part by means of a mounting plate, that two guideways each pivot about one joint, are provided on the mounting, which guideways are preferably designed as slideways, and that each guideway grips an inner rod and can be moved along the rod.

6. The device according to claim 1, wherein a control device is provided in order to time-dependently control the movement of the movable part.

7. The device according to claim 1, wherein the linear drive is designed as a linear motor, which operates in accordance with the principle of a suspension railway.

8. The device according to claim 1, wherein the jaw carriers are each connected to the jaw holders through two rigid connections guided in guideways.

* * * * *

UNITED STATES PATENT AND TRADEMARK OFFICE
CERTIFICATE OF CORRECTION

| | | |
|---|---|---|
| PATENT NO. | : 7,011,129 B2 | Page 1 of 1 |
| APPLICATION NO. | : 10/885498 | |
| DATED | : March 14, 2006 | |
| INVENTOR(S) | : Roman Kammler and Walter Baur | |

It is certified that error appears in the above-identified patent and that said Letters Patent is hereby corrected as shown below:

On the title page, item (73) and in column 1, the name of the assignee should be changed from "Rovema Verpackungsmaschienen GmbH" to
---Rovema Verpackungsmaschinen GmbH---

Signed and Sealed this

First Day of August, 2006

JON W. DUDAS
*Director of the United States Patent and Trademark Office*